United States Patent [19]

Takanashi et al.

[11] Patent Number: 4,736,243
[45] Date of Patent: Apr. 5, 1988

[54] COLOR IMAGING APPARATUS WITH CLOSED-LOOP CONTROL MEANS FOR PRODUCING COLOR SIGNAL FREQUENCY AND PHASE CONTROL SIGNALS FROM A REFERENCE COLOR SIGNAL AND TWO REFERENCE INDEX SIGNALS STORED IN A MEMORY

[75] Inventors: Itsuo Takanashi, Yokohama; Shintaro Nakagaki, Fujisawa; Hiroshi Ichimura; Takashi Kuriyama, both of Tokyo, all of Japan

[73] Assignee: Victor Company of Japan, Ltd., Yokohama, Japan

[21] Appl. No.: 790,455

[22] Filed: Oct. 23, 1985

[30] Foreign Application Priority Data

| Oct. 23, 1984 | [JP] | Japan | 59-222383 |
| Oct. 30, 1984 | [JP] | Japan | 59-228682 |
| Oct. 31, 1984 | [JP] | Japan | 59-229751 |
| Nov. 7, 1984 | [JP] | Japan | 59-167944[U] |

[51] Int. Cl.$^4$ .................... H04N 9/083; H04N 9/07
[52] U.S. Cl. .................... 358/47; 358/44
[58] Field of Search .................... 358/44, 40, 41, 43, 358/45, 46, 47, 67, 217

[56] References Cited

U.S. PATENT DOCUMENTS

| 3,755,620 | 8/1973 | McMann | 358/45 |
| 3,939,486 | 2/1976 | Tomii | 358/46 |
| 4,163,250 | 7/1979 | Tomii et al. | 358/45 |
| 4,185,296 | 1/1980 | Nishikawa et al. | 358/45 |
| 4,305,022 | 12/1981 | Mitamura et al. | 358/67 |
| 4,620,221 | 10/1986 | Takanashi et al. | 358/47 |

FOREIGN PATENT DOCUMENTS

| 34854 | 9/1979 | Japan |
| 201395 | 12/1982 | Japan | 358/43 |

Primary Examiner—James J. Groody
Assistant Examiner—Randall S. Svihla
Attorney, Agent, or Firm—Cushman, Darby & Cushman

[57] ABSTRACT

In a color imaging apparatus, an optical image is focused on a photoelectrical conversion target of a color image pickup tube through a color stripe filter and converted to an electrostatic image, the latter being scanned line-by-line in rectangular raster form by an electron beam to generate a color multiplexed video signal. First and second index stripe electrodes are located adjacent to edges of the raster area to be scanned at the beginning of each field and at the beginning of each line. A memory is provided to store field and line index signals generated by the index electrodes as well as a reference video signal generated by the target illuminated with light of a predetermined color. During normal viewing operations, the stored signals are retrieved from the memory for frequency and phase comparison with signals generated by the index electrodes and the target to control the phase relationship between the retrieved reference video signal with the color-multiplexed video signal to effect synchronous detection therebetween at proper timing to produce primary color signals. The retrieved index signals prevent the loss of proper timing when the target is dimly illuminated.

16 Claims, 13 Drawing Sheets

VARIABLE AMPLITUDE RAMP GEN 116

COLOR IMAGING APPARATUS WITH CLOSED-LOOP CONTROL MEANS FOR PRODUCING COLOR SIGNAL FREQUENCY AND PHASE CONTROL SIGNALS FROM A REFERENCE COLOR SIGNAL AND TWO REFERENCE INDEX SIGNALS STORED IN A MEMORY

CROSS-REFERENCE TO RELATED APPLICATION

This application is related to co-pending U.S. patent application Ser. No. 582,226, filed Feb. 21, 1984, now U.S. Pat. No. 4,620,221, by I. Takanashi et al and assigned to the same assignee as the present invention.

BACKGROUND OF THE INVENTION

The present invention relates to a single-tube color imaging apparatus having a striped color filter and more particularly to an apparatus which eliminates the problem associated with variation of beam scanning speed resulting from electrostatic potential differences between dark and bright areas on a photoelectrical conversion target.

In a single-tube color imaging apparatus, an optical image is focused through a striped color filter onto a photoelectrical conversion target to develop an electrostatic image which is scanned line-by-line by an electron beam. The color filter comprises successively arranged recurrent groups of color stripes of different colors. As the beam is scanned across the target, a color-multiplexed video signal is generated. This video signal comprises a "carrier" having a frequency inversely proportional to the interval at which the recurrent groups of the filter are arranged, the carrier being modulated in phase with the individual stripes of each recurrent group and in amplitude with the intensity of elemental areas of the incident image so that it varies in frequency inversely proportional to the intervals at which the recurrent groups of the strips are arranged and in phase with the relative values of primary color components contained in the color image passing through the stripes of each group and contains a phase deviation representing spatial differences between the strips of each group and a phase deviation representing nonlinearity in the speed of said electron beam in the direction of the line-by-line scan. The video signal is applied to a pair of synchronous detectors to which are also applied phase-shifted reference carriers. These reference carriers are derived from the pickup tube as it is illuminated uniformly with light of a predetermined color and stored into a memory prior to operation of the imaging apparatus. If the actual image is wholly or partially dark, the color-multiplexed signal will lose the carrier component, resulting in a loss of synchronism in frequency and phase with the phase-shifted reference carriers.

SUMMARY OF THE INVENTION

It is therefore an object of the present invention to provide a color imaging apparatus which operates satisfactorily even if the carrier component is lost when the optical image of a subject is wholly or partially dark.

In the color imaging apparatus of the invention, an optical image is focused on a photoelectrical conversion target of a color image pickup tube through a color stripe filter having a plurality of successively arranged recurrent groups of different color stripes and converted to an electrostatic image which is scanned line-by-line in rectangular raster form by an electron beam to generate a color-multiplexed video signal. The video signal comprises a carrier having a frequency inversely proportional to the intervals at which the recurrent groups are arranged, the carrier being modulated in phase with the individual color stripes of each the recurrent group with respect to a reference phase and in amplitude with the intensity of elemental areas of the color image so that it varies in frequency inversely proportional to the intervals at which the recurrent groups of the stripes are arranged and in phase with the relative values of primary color components contained in the color image passing through the stripes of each group and contains a phase deviation representing spatial differences between the strips of each group and a phase deviation representing nonlinearity in the speed of said electron beam in the direction of the line-by-line scan. The apparatus includes index means having first and second portions of the target adjacent to edges of a rectangular raster field and scanned by the electron beam at periodic intervals for generating first and second index signals from the first and second portions, respectively. The first portion of the index means is located to be scanned at the beginning of each line. A field memory is provided to store the first and second index signals and a reference video signal having a duration of at least one field which is derived from the target when it is uniformly illuminated by light of a predetermined color through the color filter during write mode. The memory is read during normal operation to generate first and second reference index signals and a reference reference video signal having the reference phase. A closed-loop controller is operable during the read mode to derive frequency and phase control signals from the reference index signals from the memory and those index signals from the index means and controls the frequency and phase relationships between the reference video signal and the color-multiplexed video signal in response to the control signals. A color demodulator derives color difference signals from the reference video signal and the color-multiplexed video signal between which the frequency and phase relationships are controlled by the closed-loop controller.

BRIEF DESCRIPTION OF THE DRAWINGS

The present invention will be described in further detail with reference to the accompanying drawings, in which.

DETAILED DESCRIPTION

Figure 1:
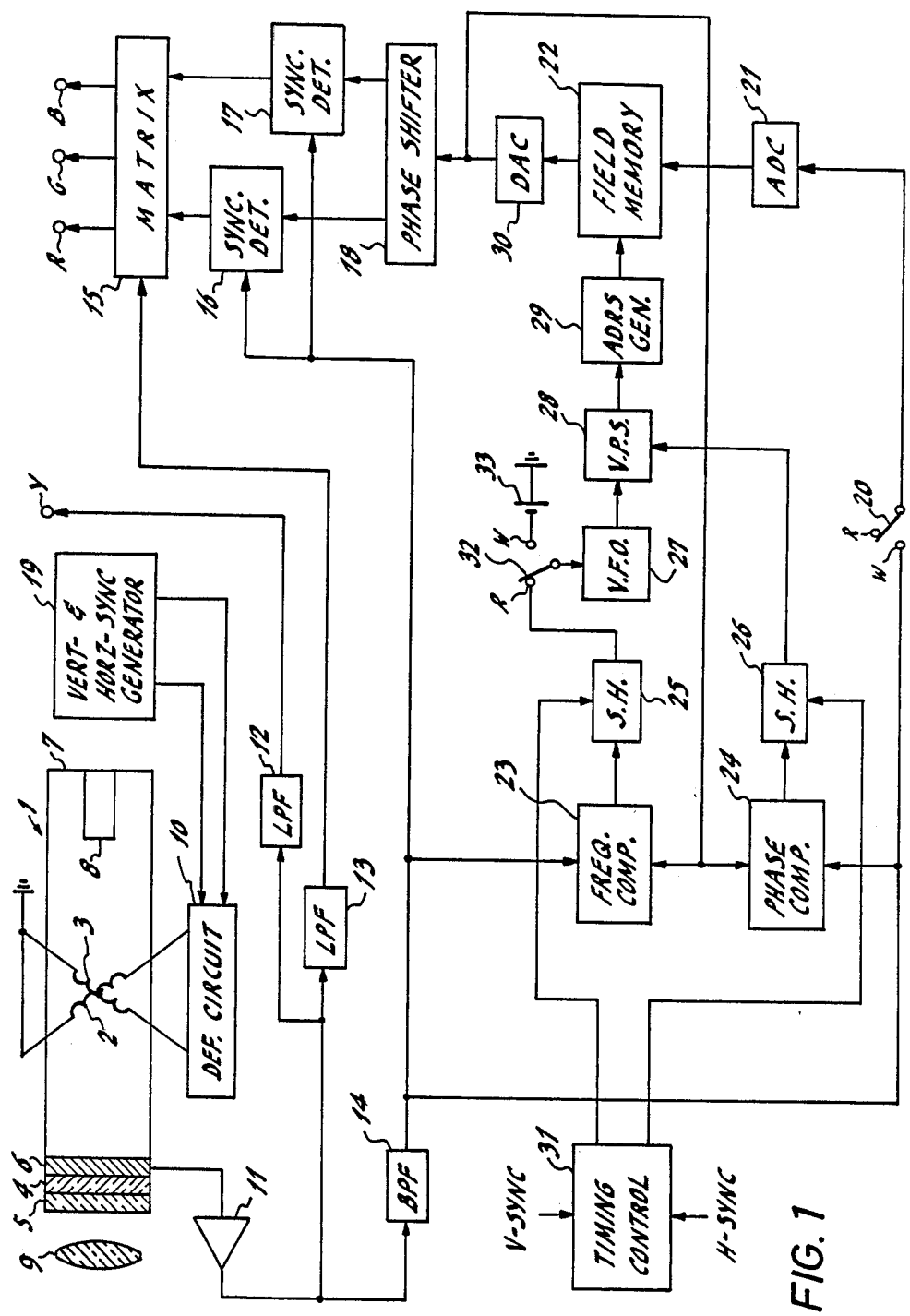
FIG. 1 is a block diagram of a single-tube color imaging apparatus incorporating a lost carrier compensation circuit according to a first embodiment of the invention.

Referring now to FIG. 1, a color imaging apparatus according to a first embodiment of the invention includes a color television pickup tube 1 having a pair of vertical and horizontal deflection yokes 2 and 3, a color stripe filter 4 affixed to the rear of a transparent faceplate 5 of an evacuated envelope 7, and a photoelectrical conversion target 6 attached to the rear of the filter 4 to be scanned by an electron beam emitted from an electron gun 8. A lens 9 focuses an object scene on the surface of the target 6 through the color filter 4. A video signal is read from the photoconductive layer of the conversion target 6 and applied to a preamplifier 11.

Color filter 4 comprises a plurality of recurrent groups of stripes of a first color F1 (which may be one of the primary colors of blue, green and red), a second color F2 (which is cyan or magenta if F1 is blue, cyan or yellow if F1 is green, or yellow or magenta if F1 is red), and transparency for passing white light. These stripes have equal width and extend vertically throughout the target 6 and successively arranged across the horizontal dimension of the target 6 with the color stripes of each group recurring at intervals T. The filter 4 has therefore a spatial frequency inversely proportional to the periodic interval T. Alternatively, the color filter may comprise recurrent groups of stripes of red, green and blue of different widths with the groups being arranged at intervals T.

Light passing through the color filter 4 is optically modulated by the striped color filter pattern and develops an electrostatic image on the conversion target 6 which is read by the electron beam scanned. Line-by-line rectangular raster scan is provided by the horizontal and vertical yokes 2 and 3 energized by sweep currents supplied from a deflection circuit 10. For purposes of illustration, it is assumed that the first filter stripe F1 is green and the second stripe F2 is cyan. The light incident on the green stripes is removed of its red and blue components to allow its green component to pass to target 6, while the light incident on the cyan stripes is removed of the red component (R) to allow its green (G) and blue (B) components to pass to target 6. Therefore, if the target is illuminated with an imagewise radiation of white light (equal energies at all wavelengths throughout the visible spectrum), the color-multiplexed signal contains (G), (B+G) and (R+B+G) components derived respectively from stripes F1, F2 and W. Therefore, the video signal S obtained from the target 6 is given by:

$$S = \frac{1}{3}(3G + 2B + R) + A \cdot \sin(\omega t + \phi + \theta) + \quad (1)$$

-continued $$\frac{A}{2} \sin(2\omega t - \phi + 2\theta)$$

where, $A = -(\sqrt{3}/\pi)(B^2 + B \cdot R + R^2)^{\frac{1}{2}}$ $\phi = \tan^{-1}(R - B)/\sqrt{3}(R + B)$ $\omega = 2\pi/T = 2\pi f_1$ (where $f_1$ represents the frequency of the "carrier"). The phase component $\phi$ indicates a phase deviation from the reference phase of the "carrier" and represents the spatial difference between the individual filter stripes within each recurrent group, and the phase component $\theta$ represents a phase deviation attributed to the nonlinearity of the deflection system.

The output of preamplifier 11 is applied to a low-pass filters 12 and 13 and to a band-pass filter 14. Low-pass filter 12 having a cut-off frequency immediately below the carrier frequency $f_1$ passes the luminance component of the video signal to a luminance output terminal Y and low-pass filter 13 having a cut-off frequency much lower than the cut-off frequency of filter 12 passes the baseband of the video signal which is represented by the first term of Equation 1 to a matrix circuit 15. The "carrier" component of the video signal, represented by the second term of Equation 1, is passed through the band-pass filter 14 to first inputs of synchronous detectors 16 and 17.

The output of band-pass filter 14 is also applied through a mode select switch 20 and an analog-to-digital converter 21 to a field memory 22 and also to a frequency comparator 23 and a phase comparator 24. Comparators 23 and 24 compare the frequency and phase of the modulated carrier passing through the band-pass filter 14 with those of an output signal from a digital-to-analog converter 30 and supply their outputs to sample-and-hold circuits 25 and 26, respectively. Sample-and-hold circuits 25 and 26 are sampled by pulses derived in a timing control circuit 31 from vertical and horizontal sync pulses supplied from a vertical- and horizontal-sync generator 19. Specifically, sample-and-hold 25 is sampled at the beginning of each "field" interval for storing a frequency difference signal until the end of the field and sample-and-hold 26 is sampled at the beginning of each horizontal line scan for storing a phase difference signal until the end of the line. These frequency and phase difference signals, which will be derived in a manner as will be described later, drive a variable frequency oscillator 27 and a variable phase shifter 28 which are connected in series to an address generator 29 that addresses the field memory 22. A mode select switch 32 applies a reference voltage from voltage source 33 to the variable frequency oscillator 27 prior to normal imaging operation.

Figure 2:
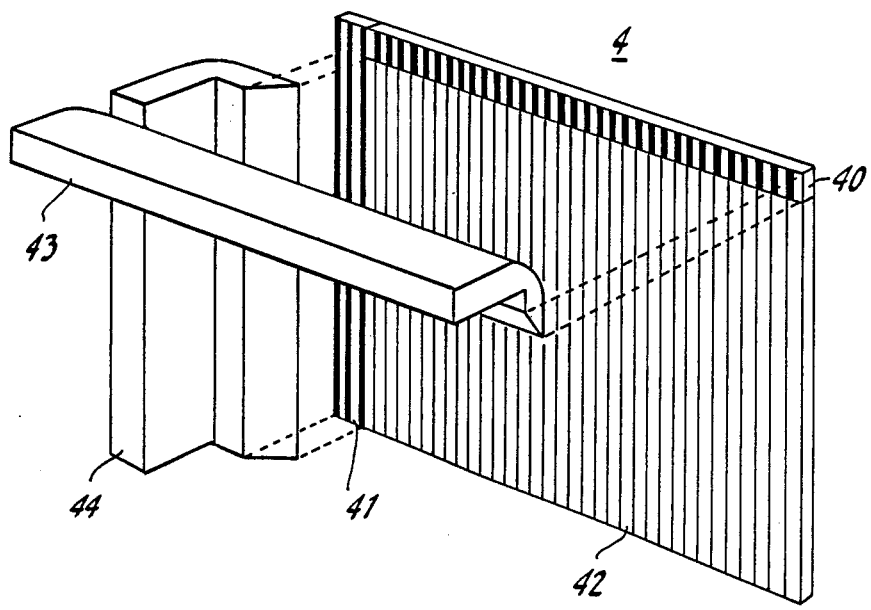
FIG. 2 is a perspective view of field and line index bands with associated light guides.
Figure 3:
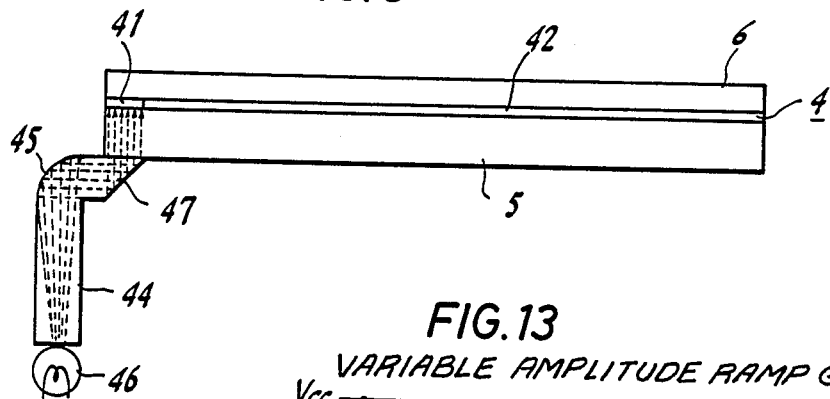
FIG. 3 is a plan view illustrating the light guide for illuminating the line index band through the faceplate of a pickup tube.

As illustrated in FIG. 2, the color filter 4 includes a horizontal band 40 of alternating opaque and transparent "field" index stripes successively arranged in an area outside of and adjacent to the upper edge of an image incident area 42 but within the rectangular raster area of the electron beam and a vertically extending band 41 of likewise opaque and transparent "line" index stripes arranged in a portion of the target 6 which is outside of and adjacent to the line-start edge of image incident area 42 but within the rectangular raster scan area. Image pickup tube 1 is preferably provided with a light guide 43 which is formed of a transparent plastic material to uniformly illuminate the "field" index stripes 40 with light from an external source. A second light guide 44 of identical construction uniformly illuminates the "line" index stripes 41 with external light. As shown in FIG. 3, light guide 44 is constructed of a right-angled member having a parabolic internal reflecting bend 45 at which light from a light source 46 is reflected into parallel rays which are totally internally reflected at a surface 47 to the line index stripes 41. Light guide 44 is secured to one edge of the faceplate 5 of the image pickup tube in opposed relation to the line index stripes 41. Similarly, light guide 43 is secured to the upper edge of the faceplate in opposed relation to the field index stripes 40. Index stripes 40 and 41 are illuminated both during write and read modes of field memory 22. Target 6 is scanned so that it develops a field index signal as the beam traverses field index stripes 40 and a line index signal as it traverses the line index stripes 41. Thus, the field index signal is generated at the beginning of each field interval prior to the generation of a "field" signal and the line index signal is generated at the beginning of each line scan prior to the generation of a "line" signal.

During write mode which is prior to the normal operation of the imaging apparatus, switches 20 and 32 are manually turned to "write" position W and the target 6 is illuminated uniformly with light of a predetermined color to generate a "carrier" at frequency $f_1$ in addition to the field and line index signals, the carrier and index signals being digitized by A/D converter 21 and written into field memory 22. Variable frequency oscillator 27 is supplied with the reference voltage to generate constant-frequency clock pulses which drive the address generator 29 through variable phase shifter 28. Variable phase shifter 28 is adjusted so that it provides no phase shift when it receives zero voltage from sample-and-hold 26. Thus, in the write mode of operation, field memory 22 is addressed at a constant rate by address generator 29 to write the index signals and the reference carrier.

During normal operation, switches 20 and 32 are returned to "read" position R and the target 6 is illuminated with the optical image of an object to produce a signal which is a "carrier" modulated in amplitude with the intensity of picture elements of the image and in phase with the individual stripes of each recurrent group of the filter 4, as represented by the second term of Equation 1. The modulated carrier has a phase difference $\phi$ with respect to the reference "carrier" stored in memory 22. Target 6 is also illuminated with an optical image formed by light rays passing through the field and line index bands 40 and 41 to produce field and line index signals, respectively.

Frequency difference between the field index signal from band-pass filter 14 and the reference field index signal from D/A converter 30 is detected by frequency comparator 23 at the beginning of each field and stored in sample-and-hold circuit 25 until the end of that field. Phase difference between the line index signal from band-pass filter 14 and the reference line index signal from D/A converter 30 is detected by phase comparator 24 at the beginning of each scan line and stored in sample-and-hold circuit 26 until the end of that line scan. The stored frequency difference drives the variable frequency oscillator 27 so that address generator 29 is clocked at a constant rate that is determined by the frequency difference between the compared field index signals, so that the frequency of a modulated carrier that occurs in succession to the field index signal matches in frequency with the reference carrier read out of memory 22. If any phase difference exists between the compared line index signals, the output of oscillator 27 is phase-controlled by variable phase shifter 28 in accordance with the phase difference stored in sample-and-hold circuit 26 and this phase compensation is repeated for each line. The reference carrier thus generated by the frequency and phase compensation is represented by $\sin(\omega t + \theta)$. The nonlinearity phase component $\theta$ represents the nonlinearity of the deflection system caused when the electron beam scans the field index stripes 40, this phase component being equal to the nonlinearity phase component of the modulated "carrier" generated during each line scan.

The output of D/A converter 30 is fed to a phase shifter 18 where it is shifted in phase by $+60°$ and $-60°$ with respect to the modulated "carrier" and applied respectively to synchronous detectors 16 and 17. Color difference signals are produced by the synchronous detectors 16 and 17 and applied to color matrix circuit 15 where they are combined with the baseband of the color-multiplexed signal from low-pass filter 13 to generate primary color signals, which are applied to terminals R, G and B. It is seen therefore that in cases where the output of band-pass filter 14 contains little or no carrier component the frequency difference which may exist between the reference and present field index signals controls the variable frequency oscillator 27 instead of it being controlled with the frequency difference which might exist between the lost carrier and the reference carrier.

Figure 4:
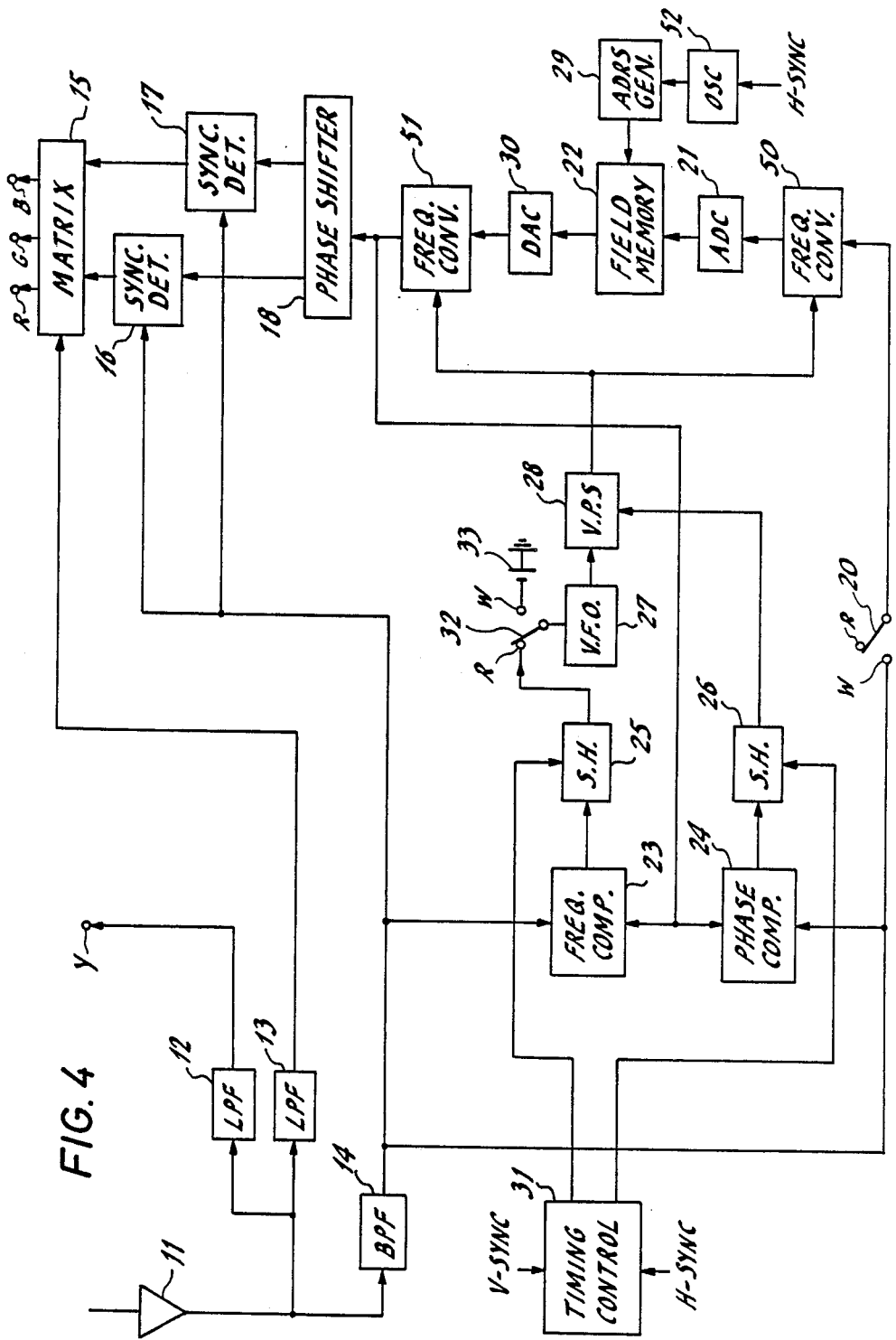
FIG. 4 is a block diagram of an alternative form of the first embodiment of the invention.

An embodiment shown in FIG. 4 is similar to the FIG. 1 embodiment except that it employs frequency converters 50 and 51 and a constant frequency oscillator 52. The reference carrier generated in the write mode is fed to the frequency converter 50. Frequency converter 50 essentially comprises a mixer which combines a constant frequency carrier from variable phase shifter 28 with signals from band-pass filter 14 passed through switch 20 during write mode to "beat down" their frequencies to produce lower-frequency "field and line" index signals and a lower-frequency reference carrier. The purpose of the frequency reduction is to reduce the memory capacity of field memory 22. Address generator 29 is clocked by oscillator 52 which is reset to a predetermined phase in response to a horizontal sync pulse to store the lower-frequency signals into field memory at a constant rate.

During read mode, field memory 22 is addressed at the same constant rate as in write mode. The output of D/A converter 30 is mixed with the output of variable phase shifter 28 to reconvert the frequencies of the signals read out of memory 22. The field and line reference index signals from frequency converter 51 are compared with the corresponding index signals from band-pass filter 14 by frequency and phase comparators 23 and 24 in a manner identical to that of FIG. 1 to control the variable frequency oscillator 27 and variable phase shifter 28. The frequency and phase of the locally oscillated carrier that is applied to frequency converter 51 are therefore controlled by the frequency difference between the reference field index signal and the corresponding field index signal from the target 6 and further controlled by the phase difference between the reference line index signal and the corresponding line index signal from the target. Frequency converter 51 reconverts or "beat up" the frequency of the output of D/A converter 30 to original frequency values in response to the frequency and phase differences, so that reference carrier output which is fed to phase shifter 18 from frequency converter 51 is matched in frequency and phase with the modulated carrier from band-pass filter 14.

Figure 5:
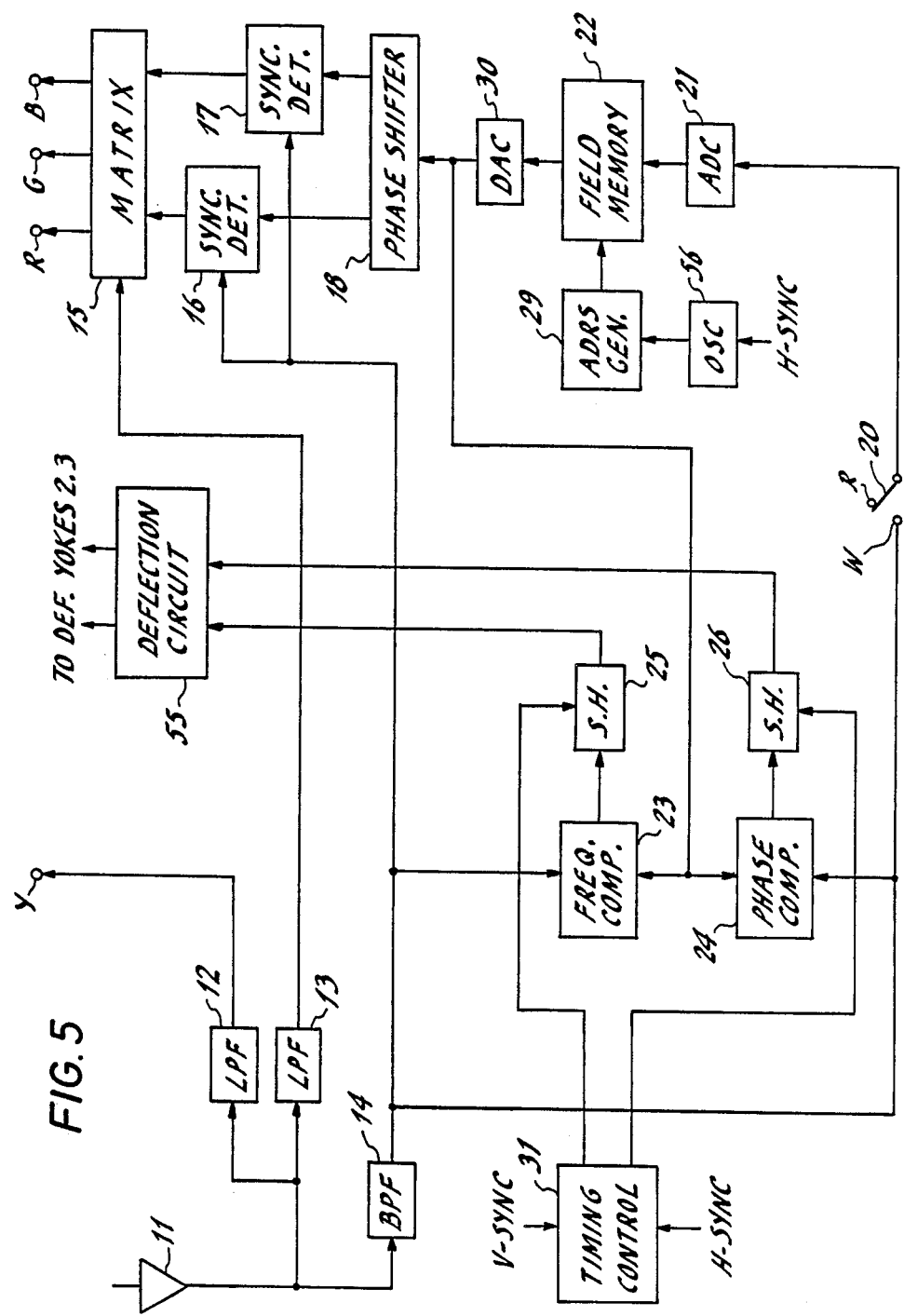
FIG. 5 is a block diagram of a modification of the first embodiment of the invention.
Figure 6:
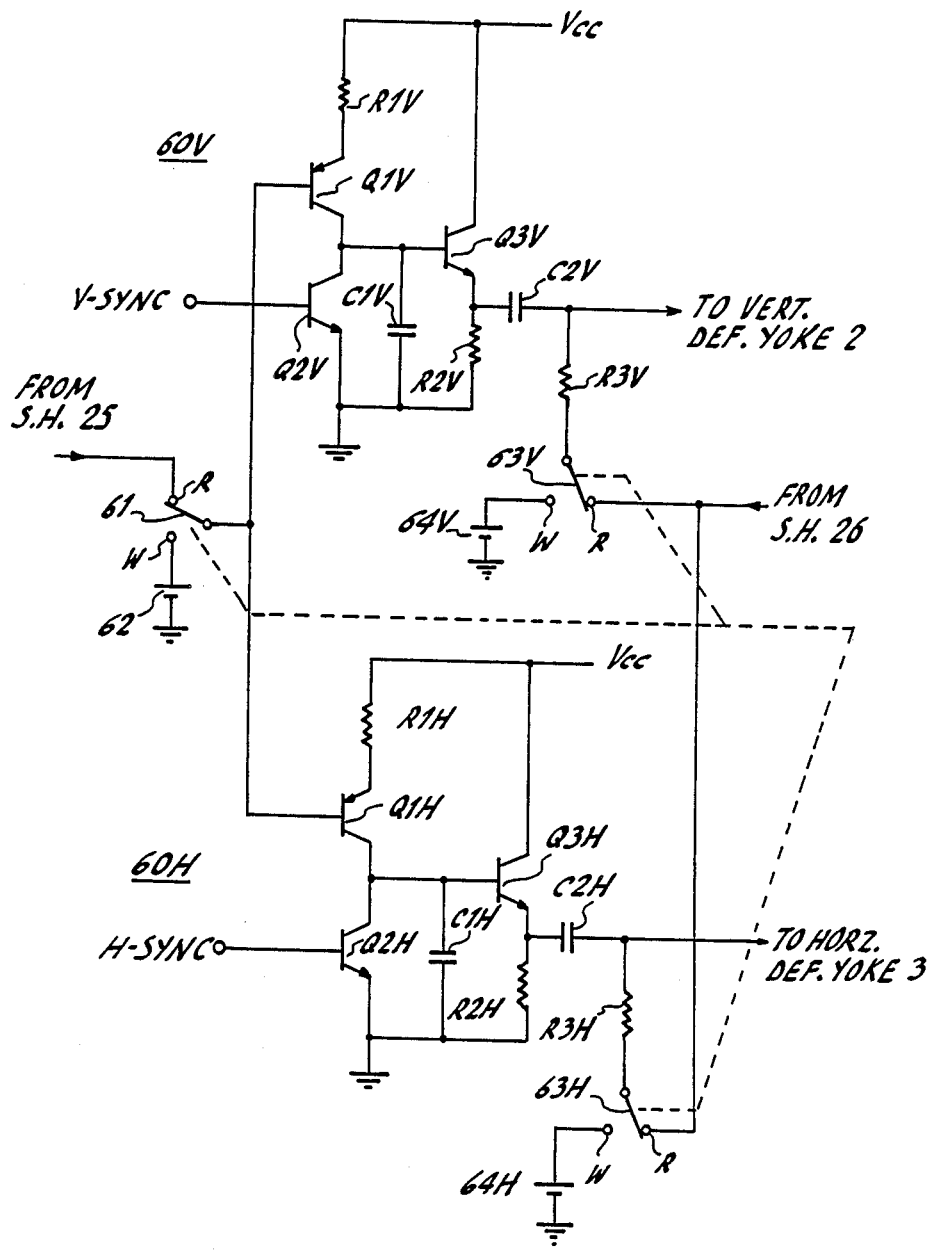
FIG. 6 is a circuit diagram of the deflection circuit of FIG. 5.

FIG. 5 is a modification of the FIG. 1 embodiment in which the frequency and phase of the modulated carrier are controlled by a deflection circuit 55 in response to the outputs of sample-and-hold circuits 25 and 26. In this modification, the reference signals are written and read at constant rate determined by oscillator 56 as in the FIG. 4 embodiment. FIG. 6 shows details of the deflection circuit 55. Deflection circuit 55 comprises a vertical deflection circuit 60V and a horizontal deflection circuit 60H of identical construction with different circuit parameters. Each of the deflection circuits includes a constant current source formed by a resistor R1 and a transistor Q1 connected in a series circuit with a switching transistor Q2 from a voltage supply Vcc to ground. The bases of transistors Q1V and Q1H are coupled together to a moving contact arm of a manually operated switch 61 and the bases of transistors Q2V and Q2H are biased by vertical and horizontal sync pulses, respectively. The read-write switch has a write terminal W impressed with a reference voltage by a voltage source 62 and a read terminal R to which the output of sample-and-hold 25 is applied.

The collector-emitter path of transistor Q2 is in shunt with a storage capacitor C1 which charges through the constant current source when the transistor Q2 is nonconductive and discharges when the latter is biased conductive in response to the respective sync pulse. The voltage developed across the capacitor C1 biases a transistor Q3 which is in series with a resistor R2, forming a buffer amplifier. Voltages developed across resistors R2V and R2H are applied through coupling capacitors C2V and C2H to deflection yokes 2 and 3 respectively.

Manually operated mode select switches 63V and 63H are ganged with switch 61. The read terminals R of switches 63V and 63H are coupled together to the output of sample-and-hold 26 and the write terminals W are impressed with beam centering reference voltages from voltage sources 64V and 64H, respectively. Each of the switches 63 has a moving contact arm which is coupled by a resistor R3 to the associated deflection yoke.

During write mode, switches 61, 63V, 63H are turned to write position W. The constant current source transistors Q1V and Q1H are biased at a reference potential to generate vertical and horizontal reference sweep voltages. The vertical and horizontal yokes are respectively impressed with the reference sweep voltages which are respectively summed with beam centering reference potentials which are determined so that the electron beam is exactly centered on the target. The target is then illuminated with light of of a predetermined color in the same manner as in the previous embodiment to generate a "carrier" and applied through band-pass filter 14 and through switch 20 to A/D converter 21 and stored into field memory 22 at constant rate.

During read mode, the transistors Q1V and Q1H are biased with an error voltage supplied from sample-and-hold 25 so that the vertical and horizontal sweep waveforms are adjusted in a direction tending to compensate for any variations in the deflection waveforms. The phase error signal from sample-and-hold 26 is applied to the yokes 2 and 3 to compensate for beam's deviation from the calibrated center position.

Figure 7:
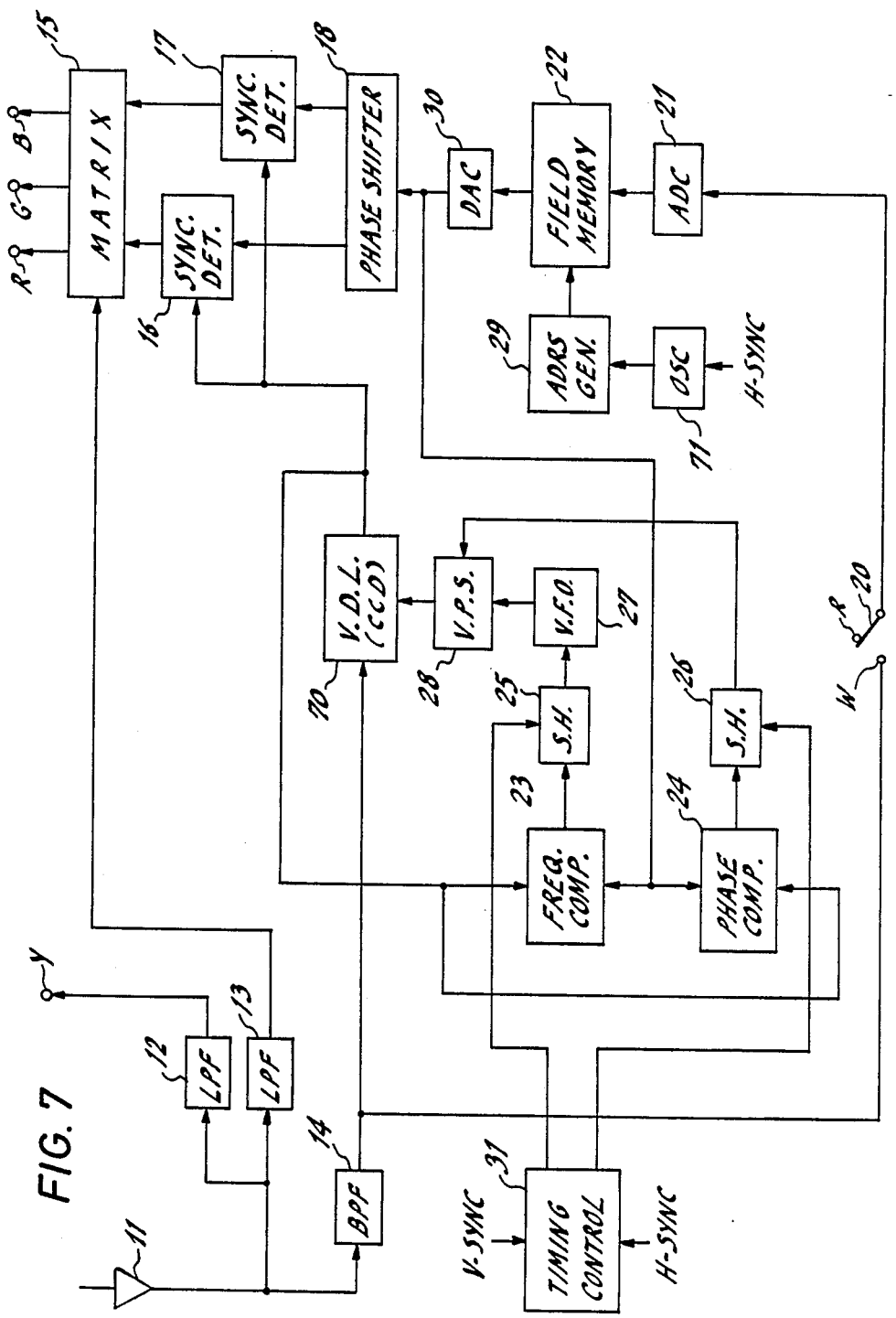
FIG. 7 is a block diagram of a further modification of the first embodiment of the invention.

FIG. 7 is an illustration of a further modification of the FIG. 1 embodiment. In this modification, a variable delay line or a charge-coupled device 70 is employed and field memory 22 is addressed at constant rate by oscillator 71 during write and read modes. Delay line 70 is connected to the band-pass filter 14 to introduce a delay time to the modulated carrier before it is applied to synchronous detectors 16, 17 in response to the output of variable phase shifter 28. Frequency and phase comparators 23 and 24 take their first inputs from the output of variable delay line 70 and their second inputs from D/A converter 30 to supply their outputs through respective sample-and-holds to variable frequency oscillator 27 that drives the delay line 70 by way of variable phase shifter 28. The amount of time delay is therefore controlled with the frequency of the oscillator 27 and the timing of this delay is controlled with the phase shifter 28 in a feedback loop. The modulated carrier applied to synchronous detectors 16 and 17 is therefore matched in frequency and phase with those supplied from phase shifter 18.

Figure 8:
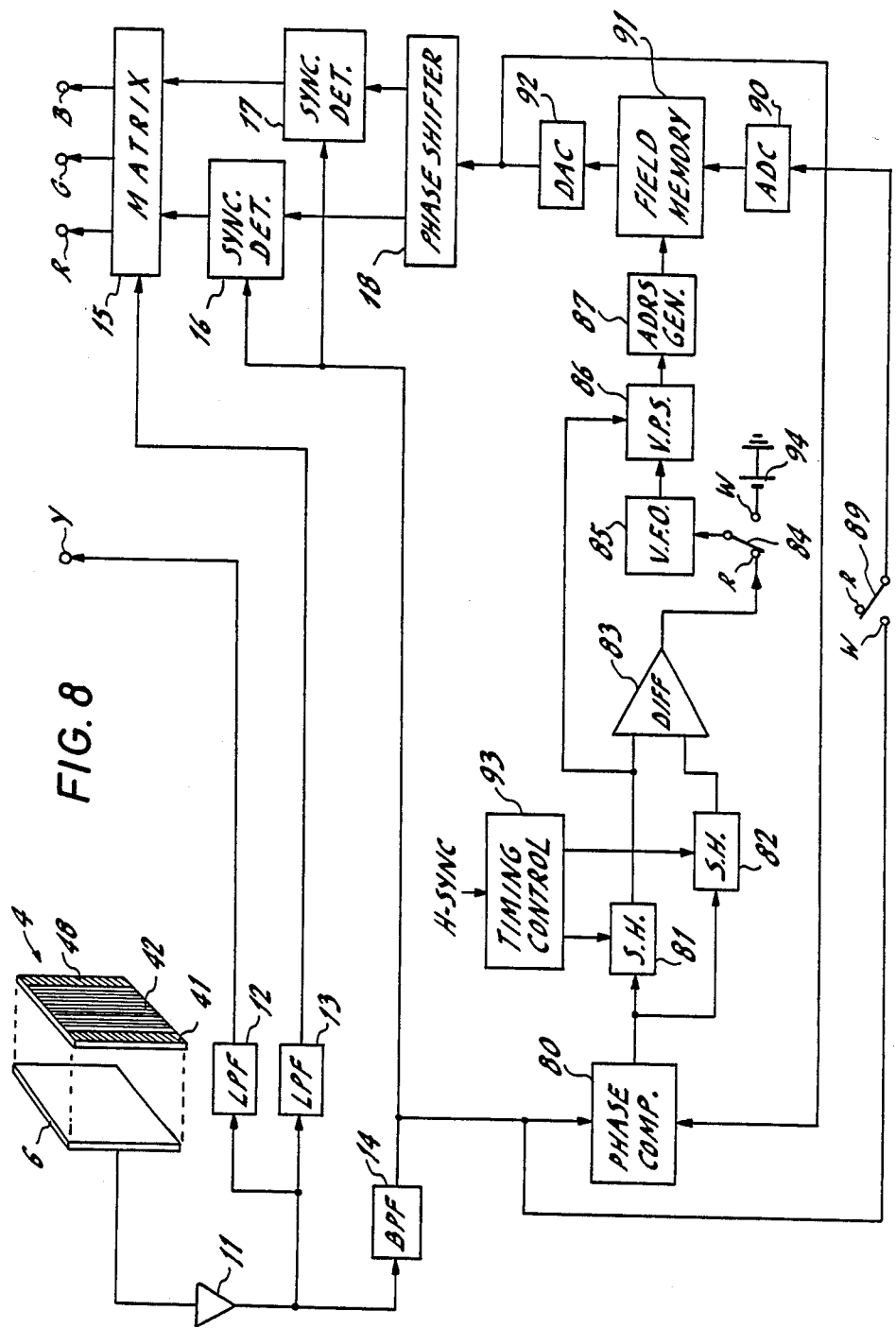
FIG. 8 is a block diagram of a second embodiment of the present invention.

FIG. 8 is an illustration of a second embodiment of the present invention in which line index signals are generated at the beginning and end of each line scan by line index bands 41 and 48 which extend vertically parallel to the line-start and line-end edges of image incident area 42, respectively, while the field index band 40 employed in the embodiments of FIGS. 1, 4, 5 and 7 is dispensed with. During write mode, first and second line index signals are generated respectively by the line index stripes 41 and 48 and stored with the reference carrier into memory 91 via switch 89 and A/D converter 90 at a constant rate determined by a voltage which is supplied from DC source 94 via switch 84 to variable frequency oscillator 85 which in turn clocks address generator 87 via variable phase shifter 86.

During read mode, a phase comparator 80 compares the modulated carrier from band-pass filter 14 with a reference carrier output from D/A converter 92. The output of phase comparator 80 is applied to sample-and-hold circuits 81 and 82. Sampling pulses for sample-and-hold circuits 81 and 82 are derived by a timing control circuit 93 from horizontal sync pulses so that sample-and-hold 81 is timed to sample a phase difference between a first line index signal developed at the beginning of each line scan from the line-start index band 41 and the corresponding reference line index signal read from memory 91 and sample-and-hold 82 is timed to sample a phase difference between a subsequent line index signal generated by the line-end index band 48 and the corresponding line index signal subsequently read from the memory.

A differential amplifier 83 compares the phase difference values stored in sample-and-holds 81 and 82 with each other to detect a difference therebetween. This difference indicates a frequency variation of the modulated carrier as it experiences during a line scan, this being applied to variable frequency oscillator 85 via switch 84. Variable phase shifter 86 provides variable phase shift to the output of oscillator 85 in response to the phase-difference output from sample-and-hold 81. Address generator 87 is responsive to the output of variable phase shifter 86 for addressing field memory 91 at a variable rate which is controlled with the frequency variation detected by differential amplifier 83 and is phase-controlled with the phase difference stored in sample-and-hold 81. The signal from band-pass filter 14 is therefore matched in frequency and phase with the signal read out of memory 91 even if the former lacks carrier information.

Figure 9:
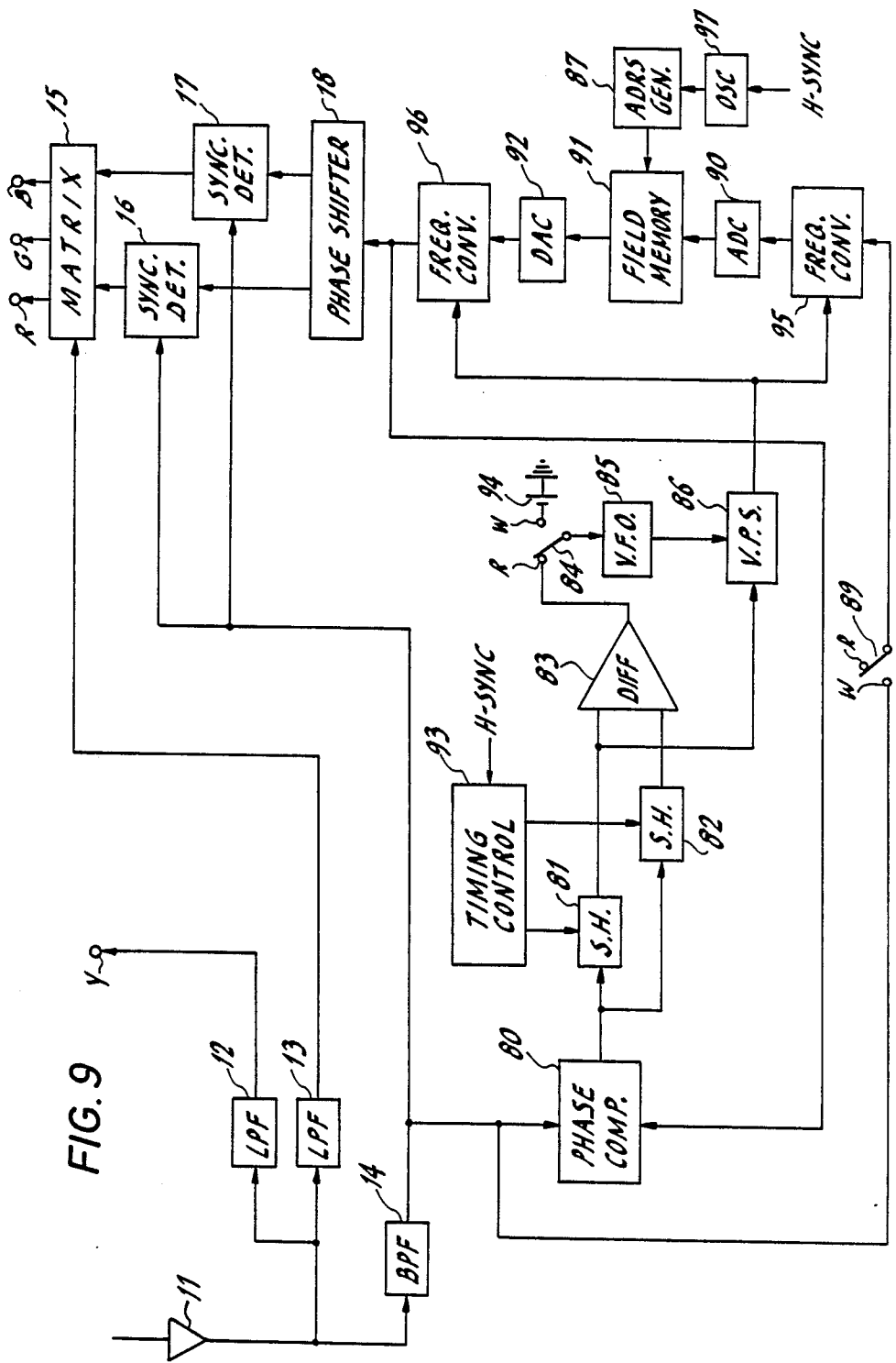
FIGS. 9–11 are block diagrams of modifications of the second embodiment of the invention.

The embodiment of FIG. 8 can be modified in various ways in like manner that the FIG. 1 embodiment is modified. In FIG. 9, the output of variable phase shifter 86 is coupled to frequency converters 95 and 96 for converting the frequencies of the line index signals and reference carrier to lower frequency values and recoverting them to original frequency values as these signals are read out of memory 91 which is addressed at a constant rate during both write and read modes by oscillator 97.

Figure 10:
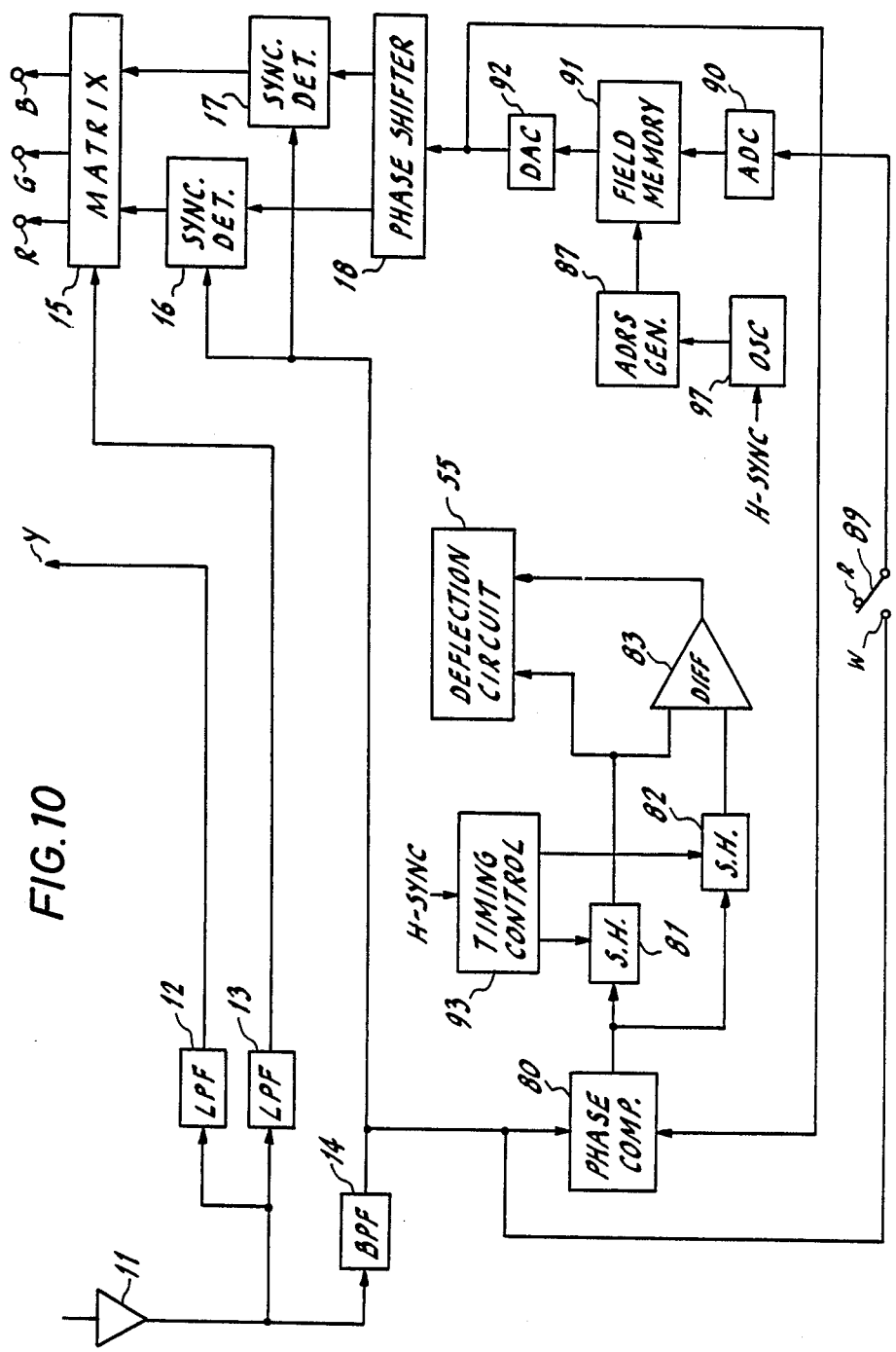

In FIG. 10, the outputs of differential amplifier 83 and sample-and-hold 81 are supplied to deflection circuit 55 of a circuit configuration identical to that shown in FIG. 6 and the field memory 91 is controlled at a constant rate during both write and read modes. Deflection circuit 55 operates in a manner identical to that described with reference to FIG. 6.

Figure 11:
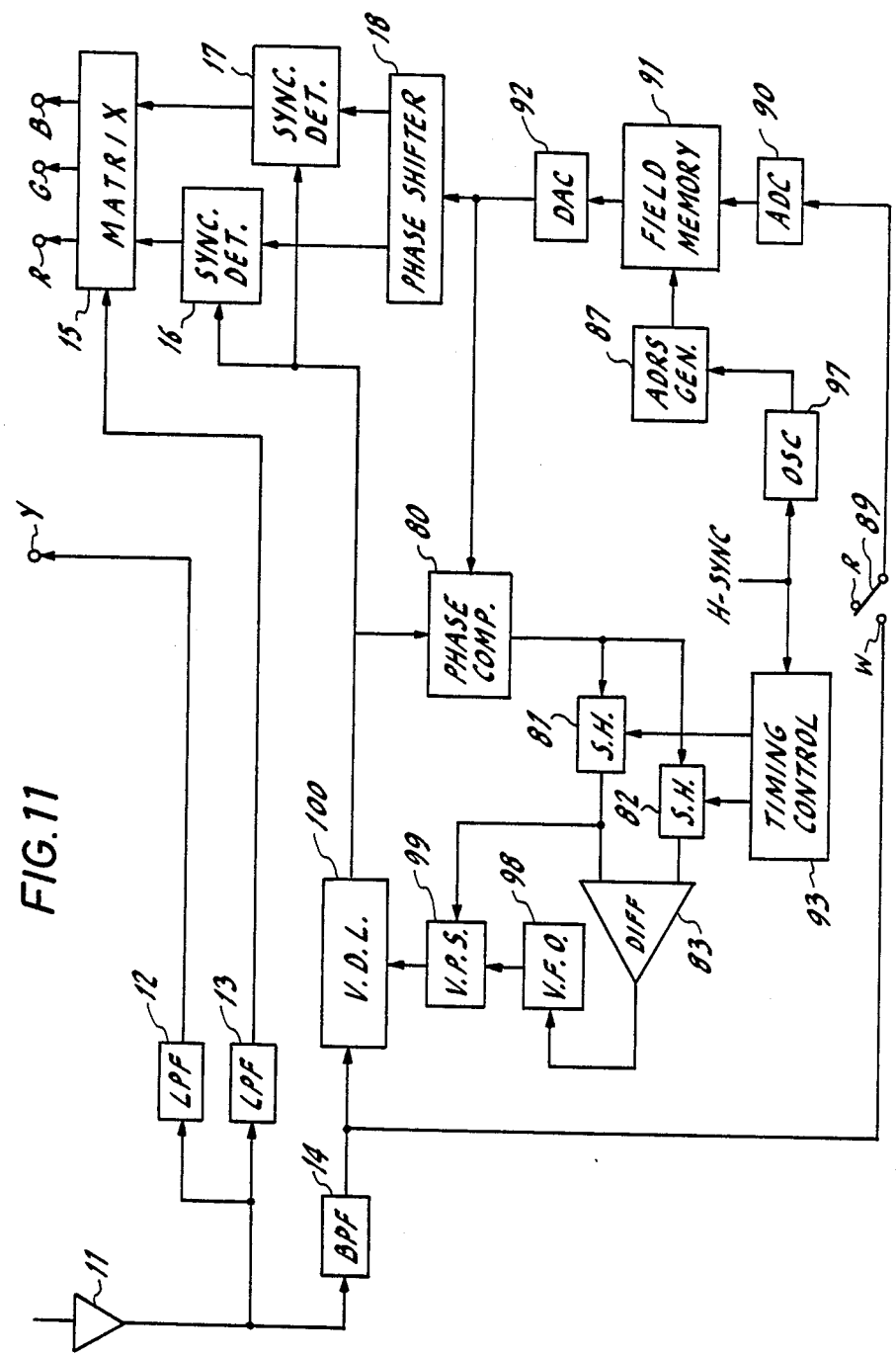

In FIG. 11, the output of differential amplifier 83 is applied to variable frequency oscillator 98, the output of which is phase-controlled by variable phase shifter 99 with the output of sample-and-hold 81 and applied to CCD variable delay line 100 connected in the circuit between band-pass filter 14 and synchronous detectors 16, 17. Field memory 91 is controlled at constant rate during both write and read modes. As in the FIG. 7 embodiment, variable delay line 100 introduces a delay time to the modulated carrier in accordance with the frequency variation detected by differential amplifier 83.

In the embodiments of FIGS. 1, 4, 7, 8 and 9, frequency variations are compensated for by closed loop feedback operation. However, due to its inherent slow response, the closed loop operation cannot follow the rapidly changing frequency variations which might occur during a line scan period. This problem is solved by controlling the timing of the modulated carrier simultaneously with the frequency and phase control of the reference carrier.

Figure 12:
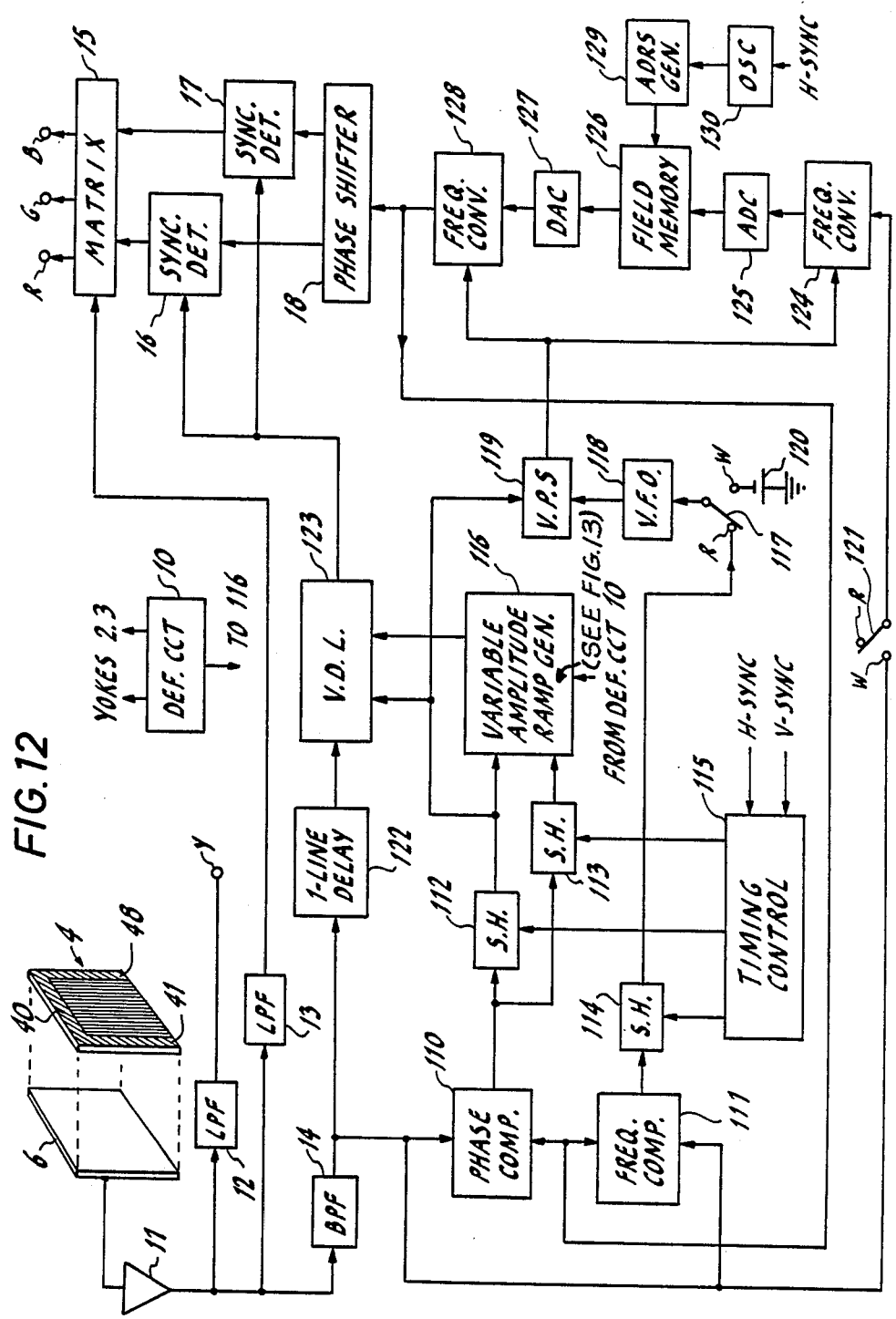
FIG. 12 is a block diagram of a third embodiment of the invention.

FIG. 12 is an illustration of a third embodiment of the present invention which is intended to overcome the slow-response problem. In FIG. 12, the color filter 4 is provided with the field index band 40 and line index bands 41 and 48. Phase comparator 110 and frequency comparator 111 provides phase and frequency difference information to sample-and-holds 112, 113 and 114 which are controlled by a timing control circuit 115 so that the phase differences at the beginning and end of each line scan are stored in sample-and-holds 112 and 113 respectively and the frequency difference at the beginning of each field is stored in sample-and-hold 114. The outputs of sample-and-holds 112 and 113 are fed to a variable-amplitude ramp generator 116 to cause it to generate a variable-amplitude ramp voltage having the line frequency. Sample-and-hold 114 controls the frequency of oscillator 118 through switch 117. Variable phase shifter 119 is controlled by a voltage developed in sample-and-hold 112 to phase-control the output of oscillator 118 and applies it to frequency converters 124 and 128. After passing through switch 121, the frequencies of line index signals and reference carrier from band-pass filter 14 are converted to lower-frequency values by frequency converter 124 and stored through A/D converter 125 into field memory 126. Reference voltage from DC source 120 drives the oscillator 118 at a predetermined rate to supply a constant-frequency local-oscillator carrier via phase shifter 119 to frequency converter 124. Address generator 129 and oscillator 130 provide constant-rate write and read operations. Frequency converter 128 reconverts the output of D/A converter 127 to original frequency values in accordance with the output of variable phase shifter 119. The output of frequency converter 128 is applied to comparators 110 and 111 to permit the detection of the phase and frequency differences.

The output of band-pass filter 14 is also connected through a one-line delay line 122 to a voltage-controlled variable delay line 123. Delay line 123 has a phase control terminal connected to the output of sample-and-hold 112 and a frequency control terminal connected to the output of ramp generator 116.

Figure 13:
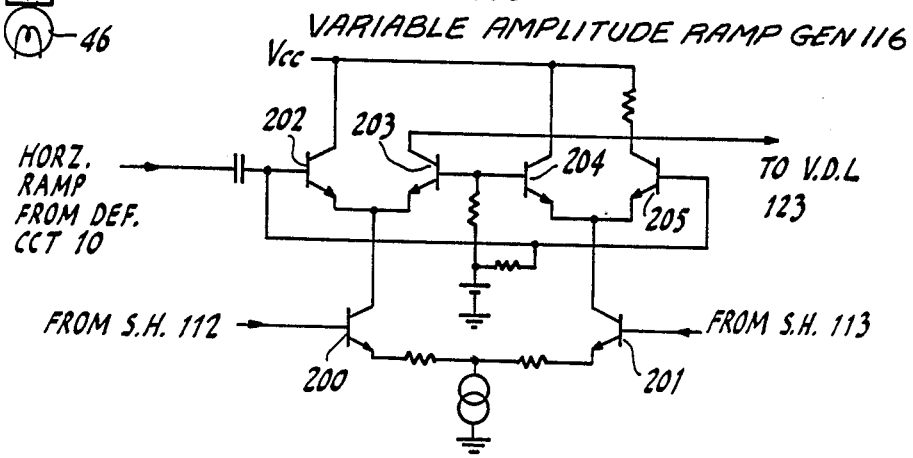
FIG. 13 is a circuit diagram of the variable-amplitude ramp generator of FIG. 12.

As shown in FIG. 13, the ramp generator 116 comprises transistors 200 and 201 connected in a differential amplifier configuration. A horizontal ramp voltage is applied from the deflection circuit 10 to the bases of transistors 202, 203, 204 and 205 which are connected in a variable-gain, balanced amplifier configuration to the transistors 200 and 201. The amplitude of the horizontal ramp waveform is controlled by frequency variation represented by a voltage difference between the outputs of sample-and-holds 112 and 113 which is detected by transistors 200 and 201. The variable amplitude ramp voltage is taken from the collector of transistor 203 to the frequency control terminal of variable delay line 123, so that the modulated carrier is linearly increasingly delayed to the extent determined by the maximum amplitude of the applied horizontal ramp voltage. Sample-and-hold 112 determines the start timing of the linear delay.

The frequency and phase of the modulated carrier are thus controlled by phase comparator 110 and frequency comparator 111 simultaneously with the frequency and phase control operation performed on the reference carrier. The delay which is inherently introduced to the reference carrier by the feedback loop is compensated for by the introduction of delay to the modulated carrier.

Figure 14:
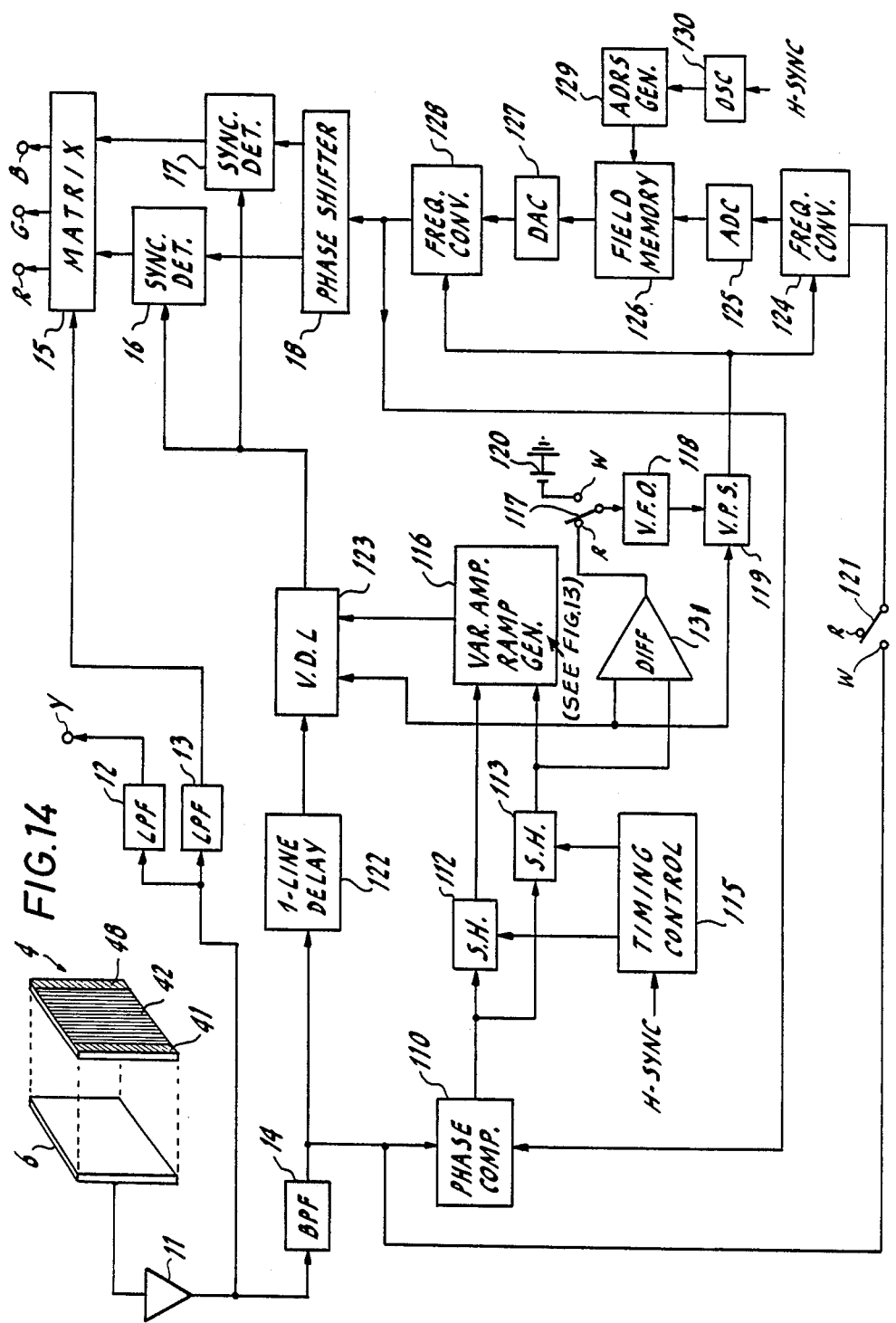
FIG. 14 is a block diagram of a modification of the third embodiment of the invention.

The embodiment of FIG. 12 can be simplified as shown in FIG. 14 in which the color filter 4 is provided with only vertically extending index bands 41 and 48. Instead of the frequency comparator 111 and sample-and-hold 114 of FIG. 12, a differential amplifier 131 is provided to detect the difference between the phase-difference values stored in sample-and-holds 112 and 113 in order to control the variable frequency oscillator 118.

It is noted in the previous embodiments that the light incident on the line index bands 41 and 48 tends to diffuse as it passes through the faceplate 5 of pickup tube and stray out of the intended path into the image incident area 42 with the result that the incident optical image is blurred at the opposite vertical edges of a viewing screen. To avoid this disadvantage, it is preferred to increase the scanning speed of the electron beam as it traverses portions of the target 6 which correspond to the boundaries between the line index bands 41, 48 and the image incident area 42.

Figure 15:
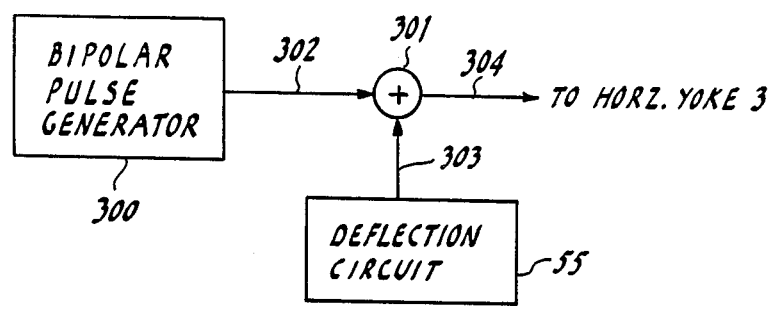
FIG. 15 is a block diagram of an embodiment which is useful for avoiding undesirable circumstances resulting from the diffusion of light rays incident on boundary areas between the index bands and an image incident area.
Figure 16:
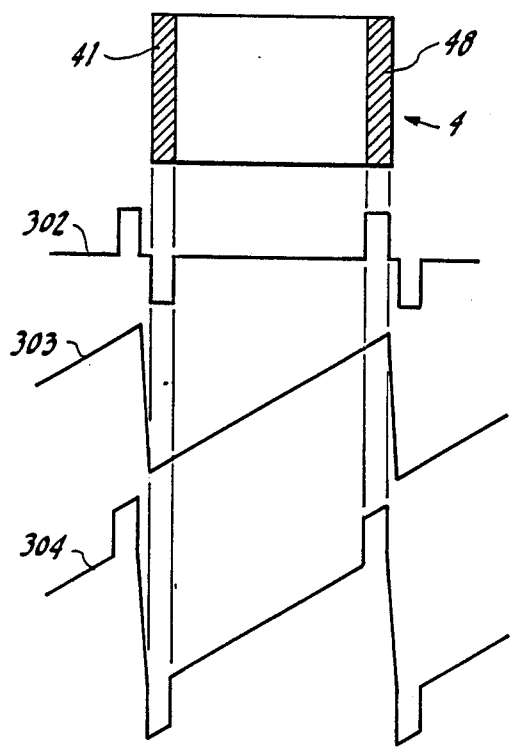
FIG. 16 is a waveform diagram associated with FIG. 15.

FIG. 15 illustrates a block diagram of an embodiment useful for causing the electron beam to skip such boundary areas. A bipolar pulse generator 300 generates a pair of positive- and negative-going narrow pulses 302, FIG. 16, so that the positive-going pulse occurs immediately preceding the falling edge of a horizonal ramp voltage 303 generated by the horizontal sweep generator 60H, FIG. 6, and the negative-going pulse occurs immediately following that falling edge. Each of the bipolar pulses has a duration corresponding to the time the beam takes to move across each line index band. The bipolar pulses are combined in a summing circuit 301 with the horizontal ramp voltage 303 to produce a combined waveform 304 having a sharply falling peak that corresponds to the boundary between the line index band 41 and image incident area 42 and a sharply rising edge that corresponds to the boundary between the line index band 48 and the area 42. The falling and rising peaks cause the electron beam to skip theses boundaries at higher speed that it scans across the image incident area.

What is claimed is:

1. Color imaging apparatus wherein an optical color image is focused on a photoelectrical conversion target of a color image pickup tube through a color stripe filter having a plurality of successively arranged recurrent groups of different color stripes and converted to an electrostatic image which is scanned line-by-line in an image incident area within a rectangular raster scan area of said target by an electron beam to generate a color-mulitiplexed video signal, wherein said video signal has a frequency inversely proportional to the intervals at which said recurrent groups are arranged, said video signal varying in phase with the relative values of primary color components contained in the color image passing through the stripes of each group and in amplitude with the intensity of said primary color components, said video signal containing a phase deviation representing spatial differences between the stripes of each group and a phase deviation representing nonlinearity in the speed of said electron beam in the direction of said line-by-line scan, comprising:

index means comprising first and second portions of said target adjacent to edges of said image incident area and within said rectangular raster scan area which are scanned by said electron beam at periodic intervals for generating first and second index signals from said first and second portions, respectively, said first portion being located to be scanned at the beginning of each line;

a field memory;

reading and writing means for writing into the memory during a write mode said first and second index signals and a video signal having a duration of at least one field derived from said target when the target is uniformly illuminated by light of a predetermined color passing through said color filter and for repeatedly reading the memory during a read mode to generate first and second reference index signals and a reference video signal;

closed-loop control means operable during the read mode for deriving frequency and phase control signals from said first and second reference index signals from said memory and said first and second index signals from said index means and for controlling the frequency and phase relationships between said reference video signal from said memory and said color-multiplexed video signal from said target in response to said frequency and phase control signals; and demodulating means for deriving color signals from the color-multiplexed video signal and the reference video signal between which the frequency and phase relationships are controlled by said closed-loop control means.

2. Color imaging apparatus as claimed in claim 1, wherein said second portion of said index means is located to be scanned prior to said image incident area, said closed-loop control means comprising:

a frequency comparator for generating a frequency difference signal by comparison between the frequencies of said second index signal from said index means and said second reference index signal from said memory;

sample-and-hold means for storing said frequency difference signal as said frequency control signal until the occurrence of a second index signal subsequently generated by said index means; and means for controlling the frequency relationship between said color-multiplexed video signal and said reference video signal in response to an output of said sample-and-hold means.

3. Color imaging apparatus as claimed in claim 2, wherein said control means further comprises:

a phase comparator for generating a phase difference signal by comparison between the phases of said first index signal from said index means and said first reference index signal.

sample-and-hold means for storing said phase difference signal as said phase control signal until the occurrence of a second index signal subsequently generated by said index means; and means for controlling the phase relationship between the color-multiplexed video signal and the reference video signal in response to an output of the last-mentioned sample-and-hold means.

4. Color imaging apparatus as claimed in claim 1, wherein said reading and writing means comprises means for generating clock pulses variable in frequency and phase in response to said frequency and phase control signals for addressing said memory during said read mode.

5. Color imaging apparatus as claimed in claim 1, wherein said reading and writing means comprises:

first frequency converter means for converting the original frequencies of said first and second index signals from said index means and said video signal from said target to lower frequencies;

means for writing and reading the frequency-converted first and second index signals and video signal into and from, respectively, said memory at a constant rate; and second frequency converter means for reconverting the lower frequencies of the frequency-converted first and second index signals and video signal read out of said memory to the original frequencies in response to said frequency and phase control signals.

6. Color imaging apparatus as claimed in claim 1, wherein said closed-loop control means comprises means for controlling the scanning speed and a reference position of said electron beam in response to said frequency and phase control signals.

7. Color imaging apparatus as claimed in claim 1, wherein said closed-loop control means comprises variable delay means for delaying one of said color-multiplexed video signal and said reference video signal with respect to the other in response to said frequency and phase control signals.

8. Color imaging apparatus as claimed in claim 1, wherein said second portion of said index means is located to be scanned at the end of each line, said closed-loop control means comprising:
    a phase comparator for generating a first phase difference signal by comparison between the phases of said first index signal from said index means and said first reference index signal from said memory and generating a second phase difference signal by comparison between the phases of said second index signal from said index means and said second reference index signal;
    first sample-and-hold means for storing said first phase difference signal until the occurrence of a first index signal subsequently generated by said index means;
    second sample-and-hold means for storing said second phase difference signal until the occurrence of a second index signal subsequently generated by said index means;
    differential amplifier means for generating a frequency difference signal as said frequency control signal by comparison between the signals stored in said first and second sample-and-hold means, said first phase difference signal being said phase control signal; and
    means for controlling the frequency and phase relationships between the color-multiplexed video signal from said target and the reference video signal from said memory in response to said frequency difference signal and said phase difference signal.

9. Color imaging apparatus as claimed in claim 8, further comprising open-loop control means comprising:
    means for generating a variable amplitude ramp voltage in synchronism with said line-by-line scan, the amplitude of the ramp voltage being variable in response to said frequency difference signal generated by said differential amplifier; and
    variable delay means for delaying one of said color-multiplexed video signal and said reference video signal with respect to the other in response to said variable amplitude ramp voltage and said first phase difference signal.

10. Color imaging apparauts as claimed in claim 9, wherein said open-loop control means further includes means for delaying said one of said color-multiplexed video signal and said reference video signal with respect to the other for a line scan period before it is delayed by said variable delay means.

11. Color imaging apparatus as claimed in claim 1, further comprising open-loop control means for controlling the frequency and phase relationships between the color-multiplexed video signal and the reference video signal in response to said frequency and phase control signals.

12. Color imaging apparatus as claimed in claim 11, wherein said open-loop control means comprises a variable delay line for delaying one of said color-multiplexed video signal and said reference video signal with respect to the other in response to said frequency and phase control signals.

13. Color imaging apparatus as claimed in claim 12, further comprising means for further delaying said one of said color-multiplexed video signal and said reference video signal with respect to the other for a line scan period before it is delayed by said variable delay means.

14. Color imaging apparatus as claimed in claim 1, wherein said index means further comprises a first plurality of successive vertical stripes of different light transmitities extending parallel to a vertical edge of said image incident area and located in front of said first portion of said target, an optical guide for guiding external light to said first plurality of vertical stripes, a second plurality of vertical stripes of different light transmittivities successively arranged in a row along a horizontal edge of said image incident area and located in front of said second portion of said target, and an optical guide for guiding external light to said second plurality of vertical stripes.

15. Color image apparatus as claimed in claim 1, wherein said index means further comprises a first plurality of successive vertical stripes of different light transmittivities extending parallel to a first vertical edge of said image incident area and located in front of said first portion of said target, an optical guide for guiding external light to said first plurality of vertical stripes, a second plurality of successive vertical stripes of different light transmittivities extending parallel to a second vertical edge of said image incident area and located in front of said second portion of said target, and an optical guide for guiding external light to said second plurality of vertical stripes.

16. Color imaging apparatus as claimed in claim 15, further comprising means for causing said electron beam to scan across the boundaries between said image incident area and said first and second portions of said target at a higher speed than it scans across said image incident area.

* * * * *